US005673327A

United States Patent [19]

Julstrom

[11] Patent Number: 5,673,327

[45] Date of Patent: Sep. 30, 1997

[54] MICROPHONE MIXER

[76] Inventor: Stephen D. Julstrom, 6608 N. Damen Ave., Chicago, Ill. 60645-5102

[21] Appl. No.: 610,440

[22] Filed: Mar. 4, 1996

[51] Int. Cl.$^{6}$ .................................................. H04B 1/00

[52] U.S. Cl. ............................ 381/119; 381/92; 381/94; 381/122; 381/123; 381/110

[58] Field of Search ............................ 381/92, 94, 119, 381/122, 123, 110; 379/206

[56] References Cited

U.S. PATENT DOCUMENTS

| | | | |
|---|---|---|---|
| 3,814,856 | 6/1974 | Dugan | 381/57 |
| 3,992,584 | 11/1976 | Dugan | 381/82 |
| 4,090,032 | 5/1978 | Schrader | 381/57 |
| 4,149,032 | 4/1979 | Peters | 381/58 |
| 4,359,602 | 11/1982 | Ponto et al. | 381/81 |
| 4,449,238 | 5/1984 | Lee et al. | 381/110 |
| 4,658,425 | 4/1987 | Julstrom . | |
| 5,259,035 | 11/1993 | Peters et al. | 381/92 |
| 5,561,737 | 10/1996 | Bowen | 381/92 |

*Primary Examiner*—Forester W. Isen

*Attorney, Agent, or Firm*—McAndrews, Held & Malloy, Ltd.

[57] ABSTRACT

An automatic microphone control system particularly suited to controlling a small, predetermined number of microphones. A representation of the level of a microphone signal is compared individually to the level representations of each of the other microphones to determine if the microphone should receive a gating trigger. If the microphone level compares favorably to each of the other microphones, and a noise adaptive threshold comparison criterion is also satisfied, then the microphone receives a gating trigger. This triggers a gate ON action for the microphone, which is held at least 0.4 seconds by a one-shot and also locked ON unless a gate ON action is initiated by any other microphone. The circuitry for a two-microphone system particularly suited to a lectern application is powerable by a conventional phantom-powering balanced microphone preamplifier input.

15 Claims, 5 Drawing Sheets

MICROPHONE MIXER

BACKGROUND OF THE INVENTION

The present invention relates to the automatic control of microphones used in sound reinforcement, recording, broadcast, teleconferencing, and other applications, and in particular of two microphones employed in fairly close proximity to each other. In many applications such as sound reinforcement, two microphones are often arrayed so that the primary pickup area of each microphone at least partially overlaps the other's. This most commonly occurs when two typically cardioid (unidirectional) microphones are mounted on short stands or goosenecks on either side of a presenter's lectern. This is often done to avoid a visual obstruction directly in front of the presenter, but also serves to broaden the pickup area over that which could be achieved with one microphone.

When the microphone signals are simply mixed together in the sound system, as is commonly done, several problems arise. First, sound quality is degraded by ever-changing comb-filter distortion of the combined microphones' frequency response. This occurs because the usual talking locations are approximately, but not exactly equidistant from both microphones. Each microphone picks up the talker's speech at comparable levels, but at slightly different times. At each frequency where the arrival time difference is equal to one-half cycle, or odd multiples thereof, the signal is cancelled to a degree dependent on the matching of the microphones' effective pickup sensitivities. Second, having two microphones active when just one would pickup the desired sound as well or better degrades gain-before-feedback and signal-to-room noise and signal-m-reverberation ratios. These latter issues are discussed extensively in "Direction-Sensitive Gating: A New Approach to Automatic Mixing" by Stephen Julstrom and Thomas Tichy, *Journal of the Audio Engineering Society*, Vol. 32, Nos. 7/8, 1984, July/August, pp. 490–506. Third, in addition to the necessary system expense of a second microphone, expense is incurred when a second microphone cable and second microphone signal mixer channel is used.

Prior art microphone systems addressed these signal quality problems by the use of an appropriate automatic mixer. Examples of an automatic mixer designed to address these problems are discussed in the above-mentioned article and in U.S. Pat. No. 4,658,425, issued to Stephen D. Julstrom and entitled "Microphone Actuation Control System Suitable for Teleconference Systems." The contents of this patent are incorporated by reference, as if fully set forth. For ease of reference, U.S. Pat. No. 4,658,425 is hereinafter referred to simply as "the referenced patent."

In particular, an automatic mixer constructed according to the teachings of the referenced patent, such as the Shure Brothers, Inc. model FP-410, is well-suited technically to the resolution of the signal quality problems. It automatically selects the microphone which is momentarily best-suited to picking up a talker, processing its signal at full gain while attenuating the other microphone by 13 dB. This gain differential is sufficient to essentially eliminate comb-filtering and gain-before-feedback loss. Greater attenuation would exacerbate audible gain-switching effects. If two talkers each address a microphone, then both are activated with an attenuation of 3 dB to prevent noise, reverberation, and feedback potential buildup. Background room noise and reverberation do not prevent proper microphone selection. Gain change attack and decay times are controlled for the best subjective effect. In order to minimize unnecessary microphone switching and maintain a consistent background noise level, a "last microphone lock-on" feature can be enabled which leaves the last microphone addressed fully active until another is addressed.

The major shortcomings of the prior art systems are cost and complexity. In contrast to the two microphone systems of the present invention, system cost and complexity are not addressed by prior art automatic mixers, and are probably made worse if an automatic mixer has to be added to an otherwise complete system. Automatic mixers require AC power (battery power is not practical in a permanent installation) and controls that can be mis-set. These limitations require that the automatic mixer be part of or located with the main sound system mixer. Further, two microphone cables are still needed. A general purpose automatic mixer also has features and capabilities, most notably a bus structure oriented towards linking mixers to handle hundreds of microphones, which are not relevant to the present application and add further cost and complexity.

Accordingly, there is a great need for a cost-effective, simple, and dedicated automatic mixer for the described two-microphone application and similar situations. It should provide the necessary automatic mixing action while being powered directly by the "phantom-powering" available from most balanced microphone preamplifier inputs. This will enable the automatic mixer to be permanently installed near the location of the two microphones, with a single microphone cable returning to a single main mixer microphone input. A sound system operator may then conveniently treat the microphone pair as a single, optimized entity. For additional cost-effectiveness, the new mixing device may also be designed to substitute for the companion preamplifiers which most electret condenser microphones ordinarily need.

Therefore, an object of the present invention is to provide a cost-effective, simplified automatic microphone mixer.

Another object is to provide an automatic mixer dedicated and optimized for a small number, typically two, of microphones.

Another object of the present invention is to provide an automatic mixer which can be powered from conventional microphone mixer "phantom-powering".

A further object of the present invention is to provide an automatic mixer which can substitute for conventional electret condenser microphone preamplifiers.

SUMMARY OF THE INVENTION

These and other objects are achieved in the disclosed embodiment of the invention which employs processing circuitry which uses accurate, varying DC level representations of the frequency equalized output of each of a plurality of microphones to make microphone gate ON, gate OFF decisions to optimize the overall speech pickup quality.

Each microphone DC level representation is processed through a slow rise, rapid fall circuit to yield a noise adaptive threshold (NAT). This threshold adjusts to the continuous background noise level present during brief pauses in speech, but does not appreciably respond to the level representations of the speech itself, as is now well-understood. When the DC level representation of a microphone exceeds its NAT by an amount, preselected at 6 dB, the microphone receives a gating trigger if a second criterion is simultaneously satisfied.

The second criterion requires that a microphone's DC level representation, scaled at one level if the microphone is already gated ON or at a lower level, here 4 dB lower, if the microphone is gated OFF, must momentarily exceed the DC level representations of all the other microphones, similarly scaled. The prior art system of the referenced patent employed a MAX bus structure to test this criterion. The MAX bus functioned as a common connection between the system's individual microphone circuit blocks. The MAX bus was always equal to the maximum of the scaled DC level representations of all the microphones. A microphone's MAX bus criterion was satisfied when its scaled DC level representation was determining the MAX bus level and, therefore, the momentary maximum. This MAX bus structure was appropriate when a large or potentially unknown number of microphones were to be automatically controlled.

In contrast to the prior art, the present invention makes direct, individual comparisons of the scaled DC level representation of each microphone against the scaled DC level representation of each other microphone. If the system is designed for more than two microphones, then the scaled DC level representation of a microphone must exceed the scaled DC level representations of all the other microphones compared individually to meet the second criterion. This can be considered the logical AND of the comparison results. If the system is designed for just two microphones, either a single comparison can be made between the scaled DC level representations and the comparison result used directly for one microphone and the logical inversion of the comparison result used for the other, or two comparators with their inputs cross-coupled can be used. The latter approach is preferred for reasons of circuit simplicity and symmetry.

A microphone's gating trigger causes a gate ON signal to be generated which is "held" for at least 0.4 seconds past the end of the most recent trigger by a retriggerable one-shot. This gate ON signal is also locked ON if no other microphone's gate ON signal is activated. This ensures that the last microphone addressed will remain ON until another, more appropriate microphone is triggered, for better continuity of pickup.

The gated microphone signals are resistively combined with the actual signal gating performed by junction field effect transistors used as voltage-controlled resistors. Shaping of the control voltages achieves a smooth, rapid attack and a smooth, slow decay. An OFF microphone is attenuated 12 dB relative to an ON microphone, sufficient to achieve the comb-filtering, noise and reverberation pickup, and gain-before-feedback improvements, and two simultaneous ON microphones are attenuated 3.5 dB relative to a single ON microphone, sufficient to avoid a noise and reverberation pickup increase or a gain-before-feedback loss.

The disclosed circuitry operates from a relatively low regulated supply voltage of 8.5 volts, without the need for a negative supply. The entire circuit, including voltage regulator, requires only approximately 10.5 volts minimum and 2.2 mA of current, enabling operation from a conventional phantom-powering balanced microphone preamplifier input. Such inputs typically provide standard phantom-powering voltages of 12 to 48 volts. The voltage regulator includes a "pi" filter network to prevent automatic mixer supply current fluctuations from coupling back into the conventional mixer microphone input.

BRIEF DESCRIPTION OF THE DRAWINGS

The present invention is described herein with reference to the drawings wherein.

DETAILED DESCRIPTION

Figure 1:
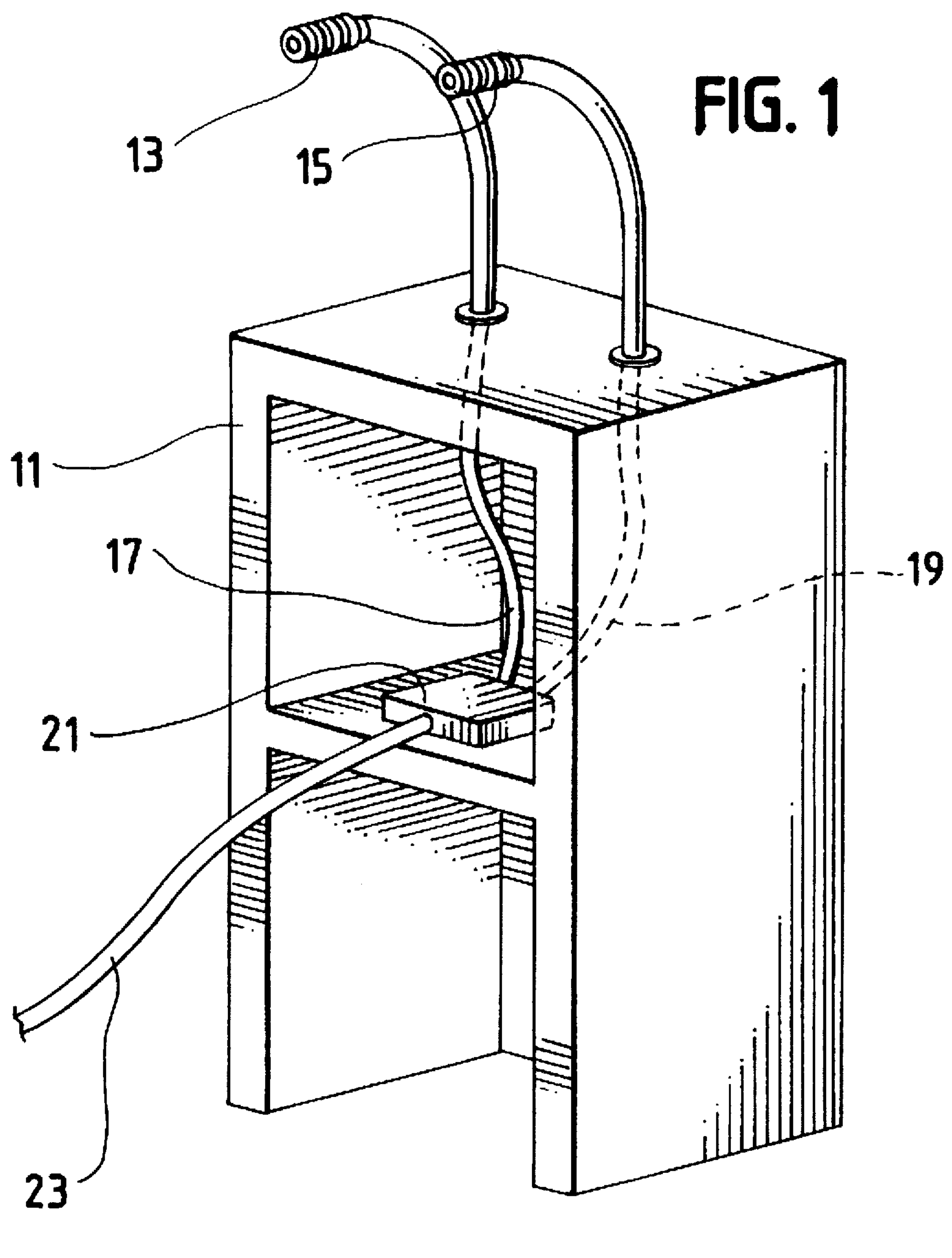
FIG. 1 is a perspective view of a typical two-microphone lectern installation appropriate for use with the present invention.

FIG. 1 shows a typical application for the present invention. A presenter or presenters stand generally behind lectern 11 with their speech directed toward microphones 13 and 15 where it is sensed. The microphone signals are transmitted through cables 17 and 19, to automatic mixer 21. The output signal from mixer 21 is transmitted by cable 23 to a conventional "phantom-powered" low impedance microphone mixer input for use in, for example, a sound reinforcement system.

Figure 2:
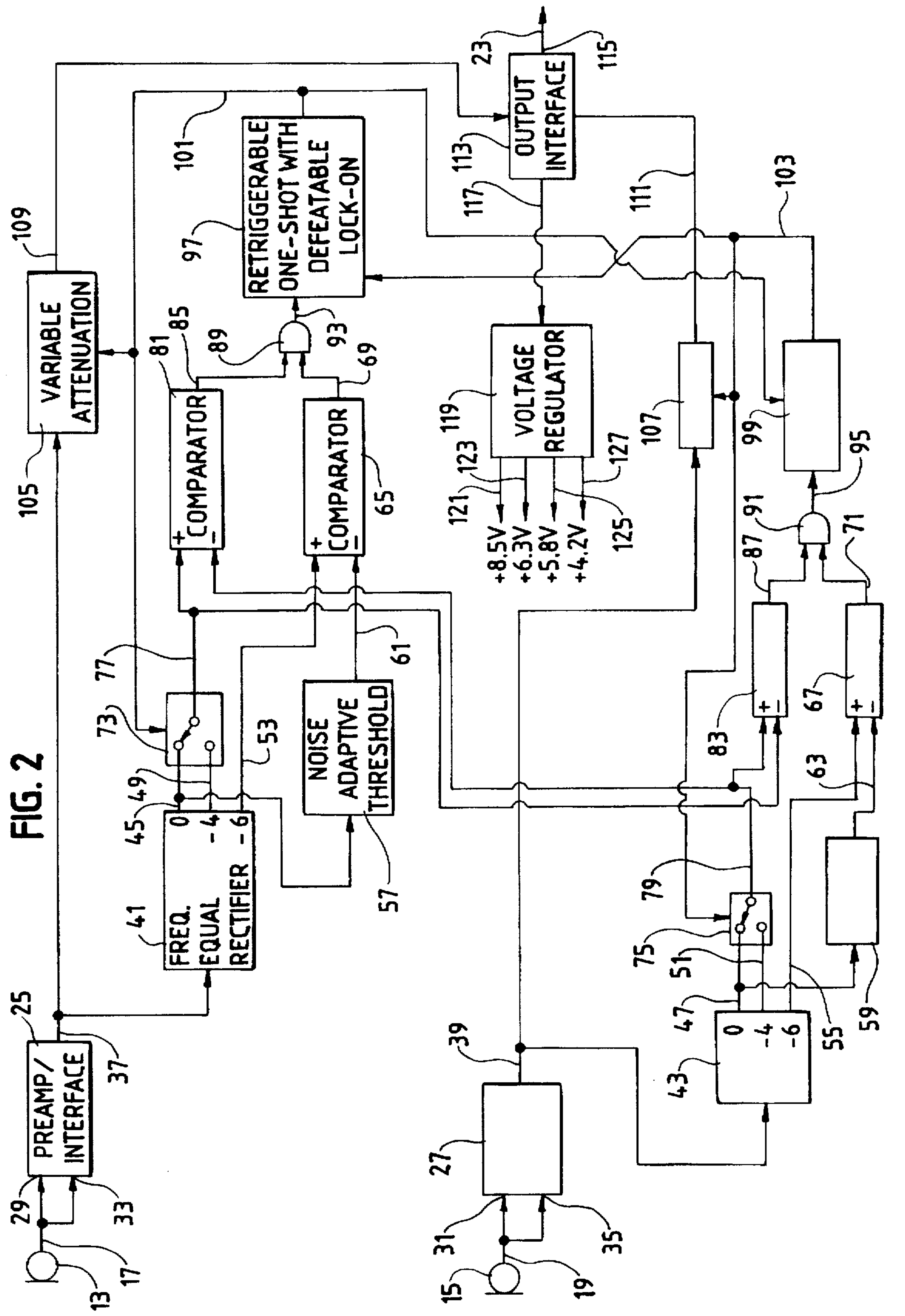
FIG. 2 is a block diagram of an embodiment of the present invention.

FIG. 2 shows a block diagram representation of microphones 13 and 15, cables 17, 19, and 23, and mixer 21. The signals from microphones 13 and 15 are transmitted through cables 17 and 19, to preamplifier/interface blocks 25 and 27. Cables 17 and 19 connect to preamp/interface inputs 29 and 31, for unbalanced microphones such as electret condenser microphones without their usual associated preamplifiers, or to inputs 33 and 35, for balanced low impedance microphones. Preamp/interface blocks 25 and 27 buffer the microphone signals providing appropriate impedance terminations, provide powering voltage for electret condenser microphone impedance converter integrated circuits if needed, provide a small level adjustment capability to match microphone sensitivities, and provide low frequency response attenuation to reduce room noise transmission. The outputs of preamp/interface blocks 25 and 27 appear on conductors 37 and 39, respectively.

Frequency equalization/rectification blocks 41 and 43 accept inputs on conductors 37 and 39, and produce varying DC voltage level signals at their outputs on conductors 45 and 47, representative of the signal amplitudes from their respective microphones. Prior to full-wave rectification and smoothing filtering, the signals are frequency-equalized to emphasize upper mid frequencies at the expense of lower frequencies and, to a lesser extent, high frequencies. This maximizes the sensitivity of the automatic microphone control to important speech sounds while minimizing the interfering effects of unwanted noise. Frequency equalization/rectification blocks 41 and 43 include 6 dB attenuated outputs on conductors 53 and 55. Additional 4 dB attenuated outputs on conductors 49 and 51, are also provided.

The output conductors 45 and 47 are operatively coupled to noise adaptive threshold (NAT) generating blocks 57 and 59. Output signals appearing on conductors 61 and 63 follow the DC level representations on conductors 45 and 47, with a slow rise and a rapid, near immediate fall characteristic. As is now well-understood, this causes the output signals to adopt a DC voltage level corresponding to the continuous background noise level picked up by their respective microphones, and which is relatively unaffected by impulsive speech sounds.

The NAT signals are then fed into comparators 65 and 67. Their respective outputs 69 and 71 are asserted when their respective 6 dB attenuated microphone level signals on conductors 53 and 55 exceed their respective noise adaptive threshold level signals on conductors 61 and 63, indicating the presence of impulsive, speech-like sounds which overcome the background noise. Typically, outputs 69 and 71 are asserted together, since both microphones will generally be receiving speech input from a talker nearly simultaneously.

Thus, a second criterion to determine a preferred microphone is needed.

Accordingly, a comparison is made between the momentary DC representations of the microphone signal levels to determine which microphone 13, 15 is the most appropriate for a given talker. To insure stable selection when a talker is addressing the microphones nearly equally, the level representations are scaled at a higher level for a microphone which is already "ON" than for one which is "OFF" (attenuated). Here, the scale shift is performed by switches 73 and 75 under the control of microphone ON gating signals 101 and 103, which select between unattenuated level representations on conductors 45 and 47, and 4 dB attenuated level representations on conductors 49 and 51, to produce scaled level representations on conductors 77 and 79.

In the referenced patent, the corresponding scaled level representations were used to generate a MAX bus signal, which is equal to the maximum of all the scaled level representations of all the microphones in the automatic mixer system. A "decisional circuit" for each microphone served to generate the MAX bus signal in conjunction with all the other decisional circuits, and to decide if that microphone's scaled level representation was the one which was momentarily determining the MAX bus level and was therefore the momentary maximum.

In contrast, the present invention incorporates a novel direct cross-coupled comparison of the scaled level representations which is particularly appropriate for a two-microphone automatic mixer. When the scaled level representation on conductor 77 exceeds the scaled level representation on conductor 79, comparator 81 asserts its output 85 and the output 87 of comparator 83 is not asserted. If the NAT criterion determined by comparator 65 is also met as represented by an assertion of output 69, then a microphone ON gating trigger is generated by AND gate 89 on conductor 93. If the scaled level representation on conductor 79 exceeds the scaled level representation on conductor 77, then comparator 83 asserts its output 87 and the output 85 of comparator 81 is not asserted. If the NAT criterion determined by comparator 67 is also met as represented by an assertion of output 71, then a microphone ON gating trigger is generated by AND gate 91 on conductor 95.

Except for insignificant errors due to comparator hysteresis and input offset, outputs 85 and 87 are complements of one another. As an alternative embodiment then, output 87 could be developed as the complement (inversion) of output 85, thus obviating the need for comparator 83. In another embodiment, particularly suited to a digital signal processing implementation, a single comparison could be made between signals equivalent to those on conductors 77 and 79, and a signal equivalent to output 85 asserted when the former is greater and a signal equivalent to output 87 asserted when the latter is greater. As yet another embodiment, the comparison could be expanded to a predetermined small number of microphones beyond two by making a microphone control channel's scaled level comparison output, such as that at 85, equal to the logical AND of multiple comparisons of its scaled level representation, such as that on conductor 77, to each of the other microphones' corresponding scaled level representations. These and any other such variations in the direct comparison of the scaled level representations on conductors 77 and 79 are considered to be within the scope of the present invention.

Microphone ON gating trigger signals on conductors 93 and 95 are input to retriggerable one-shots 97 and 99, which generate responsive microphone ON gating signals on conductors 101 and 103. Gating signals 101 and 103 control variable attenuation circuits 105 and 107, and DC level representation scaling switches 73 and 75. Retriggerable one-shots 97 and 99 extend the gating signals on conductors 101 and 103, by about 0.4 seconds past the end of the last trigger signal on conductors 93 and 95, to bridge intersyllabic gaps and pauses in the microphone speech input. With a single talker addressing the microphones, however, this timing is not visible on conductors 101 and 103. One-shots 97 and 99 also include defeatable lock-on circuitry which, in the absence of gating signal triggers on conductors 93 and 95, maintain one of the outputs on conductors 101 or 103 asserted, according to which associated one-shot 97 or 99 received the last trigger on conductor 93 or 95. The lock-on of one-shot 97 is defeated by the assertion of the output of one-shot 99 on conductor 103, and the lock-on of one-shot 99 is defeated by the assertion of the output of one-shot 97 on conductor 101.

Thus, once an initial microphone is gated ON (the gating signal on conductor 101 or 103 asserted, which will often happen at system stamp), at least one of the two microphones will always remain gated ON. There is no benefit in allowing both microphones to be gated OFF, and significantly smoother and more reliable operation is obtained by keeping at least one microphone gated ON. Further, an important aspect of the present system is that for two near-simultaneous talkers positioned so as to require both microphones for optimum pickup, both microphones will be gated ON. The 0.4 second extension (or hold) times of one-shots 97 and 99 are sufficient to bridge the gaps between intermittent gating triggers on conductors 93 and 95. These triggers cannot occur simultaneously (preventing gating of both microphones by a single talker), but can and do occur rapidly after one another for two inherently unsynchronized talkers.

The present invention implements a lock-on characteristic in one-shots 97 and 99 which is defeatable by direct input from the opposing one-shot outputs on conductors 103 and 101. Since the lock-on feature of the present invention does not employ a bus structure, it is particularly appropriate for the two-microphone configuration, although it could be expanded to a predetermined small number of microphones by making the lock-on defeat input of each microphone control channel's one-shot the logical OR of all the other system one-shot outputs.

Variable attenuation circuits 105 and 107 vary the attenuation of the microphone signals on conductors 37 and 39, according to the gating signals on conductors 101 and 103, to produce responsive attenuated microphone signals on conductors 109 and 111 with attack times of about 8 msec. and decay times of about 250 msec. When only one microphone is gated ON, the other is attenuated 12 dB relative to its full ON gain. This is a sufficient amount of attenuation to reduce comb filtering to negligible levels, but not so much as to make the gain shift from OFF to ON too subjectively abrupt. When both microphones are ON, both are attenuated 3.5 dB from their full (single microphone) ON gain. This attenuation keeps the room noise and reverberation pickup in the combined output from increasing and keeps the gain-before-feedback of an interconnected sound reinforcement system from degrading excessively. The attack time of 8 msec. appears during the rise of an OFF microphone from 12 dB relative attenuation to a two-microphone ON relative attenuation of 3.5 dB and during the fall of an already ON microphone from 0 dB relative attenuation to 3.5 dB relative attenuation. The decay time of 250 msec. appears during the fall from 3.5 dB relative attenuation to 12 dB relative attenuation of a turning OFF microphone and during the final rise from 3.5 dB relative attenuation to 0 dB relative attenuation of a newly ON microphone.

The attenuated microphone signals on conductors 109 and 111 are combined in output interface 113 which produces a responsive output signal at connector 115 to apply to output cable 23 for ultimate connection to a conventional phantom-powered low impedance microphone mixer input. Output interface 113 also accepts phantom power from the conventional mixer through cable 23 and connector 115 and delivers this powering voltage through conductor 117 to voltage regulator 119, which delivers appropriate voltages to the various parts of the automatic mixer. The main 8.5 volt supply appears on conductor 121 and a secondary 5.8 volt supply appears on conductor 123. A bias voltage of 6.3 volts appears on conductor 125 and a bias voltage of 4.2 volts appears on conductor 127.

With reference to FIGS. 3–9, NPN transistors are type 2N5210 or equivalent, PNP transistors are type 2N5087 or equivalent, N-channel field effect transistors are type 2N5457 or equivalent, op amps are one section of Motorola MC33172 or equivalent powered between ground and the 8.5 volt supply on conductor 121, and comparators are one section of National Semiconductor type LP339 or equivalent also powered between ground and the 8.5 volt supply on conductor 121.

Figure 3:
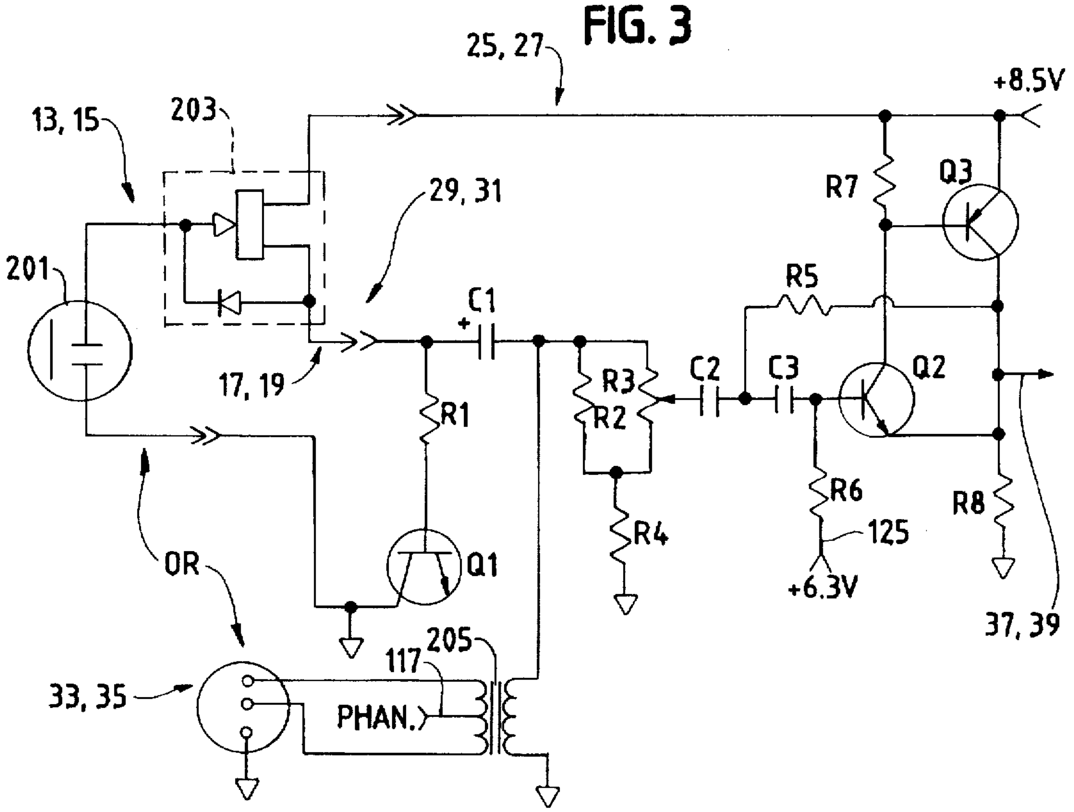
FIGS. 3–9 are schematic diagrams of the circuitry used in the embodiment shown in FIG. 2.

FIG. 3 shows one of identical preamp/interfaces 25 or 27 and its associated microphone input connections. Electret condenser microphone element 201 is connected to field effect transistor impedance converter 203 (Sanyo 2SK156J or equivalent) which receives power and outputs the microphone signal through cable 17 or 19 and connector 29 or 31. Resistor R1 serves as a source load resistor for impedance converter 203. Diode-connected transistor Q1 is forward-biased and low impedance when impedance converter 203 is connected. Capacitor C1 blocks the DC voltage at the source of converter 203 and couples the microphone signal to gain-trim network R2–R4. Alternatively, input connector 29 or 31 may be left unconnected and a conventional low impedance microphone may be connected to input connector 33 or 35, which couples the low impedance microphone signal to the primary winding of input transformer 205. Transformer 205 also transfers phantom-powering voltage to a connected low impedance microphone from voltage applied to the center tap of its primary winding on conductor 117 which output interface 113 obtained from the interconnected conventional mixer. Input transformer 205 is a step-up transformer with a 1:5 turns ratio. The secondary of transformer 205 is also applied to gain-trim network R2–R4. When the low impedance balance microphone input at connector 33 or 35 is used rather than connector 29 or 31, diode-connected transistor Q1 does not conduct, preventing signal flow in R1 and preventing R1 from loading the secondary of transformer 205 and lowering the input impedance at connector 33 or 35.

Gain-trim adjustment resistor R3 is normally adjusted fully up, with no attenuation. If one microphone is more sensitive than the other, then resistor R3 of network R2–R4 may be adjusted to provide up to 6 dB of attenuation to balance the two microphones, at the expense of the addition of a small amount of thermal noise. Capacitors C2, C3, resistors R5–R8, and transistors Q2, Q3 form a conventional low noise, unity gain, 12 dB/octave high pass filter buffer stage. Bias is obtained through resistor R6 from the 6.3 volt output of voltage regulator 119 on conductor 123 such that the output at conductor 37 or 39 is biased to 5.8 volts.

Figure 4:
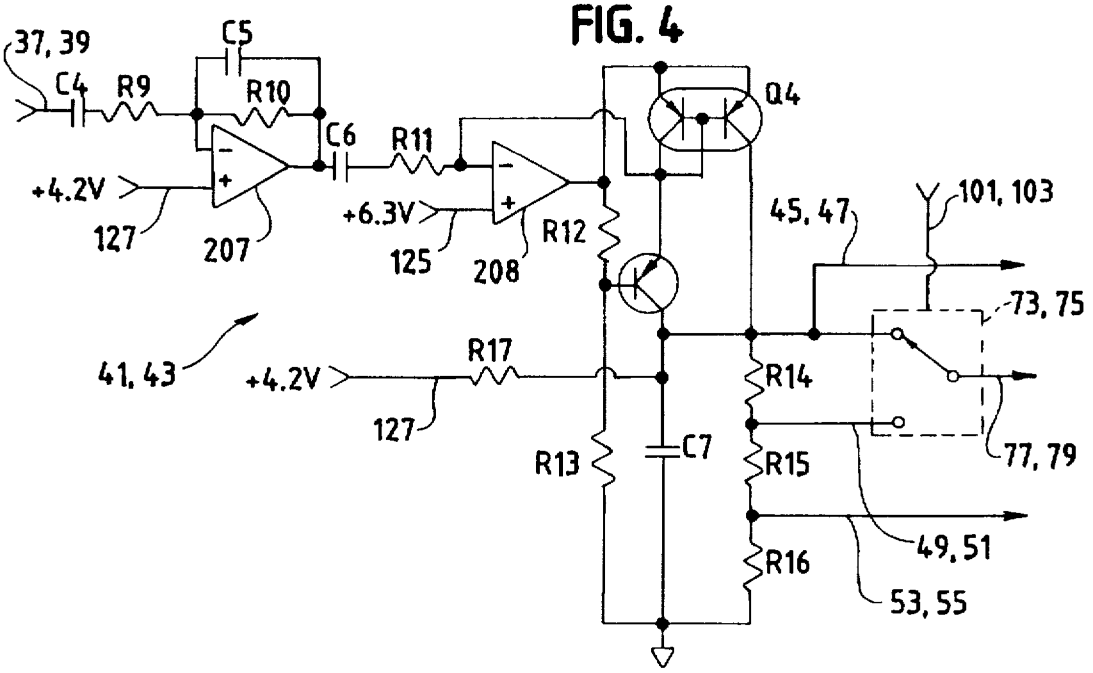

FIG. 4 shows one of identical frequency equalization/rectifier blocks 41 or 43 and its associated DC level representation scaling switch 73 or 75. Signal input comes from preamp/interface 25 or 27 along conductor 37 or 39. Op amp 207 in conjunction with capacitors C4–C6 and resistors R9, R10 form a gain and frequency equalization circuit. Op amp 207 is biased from the 4.2 volt reference on conductor 123 for maximum output signal swing.

Op amp 208 in conjunction with dual transistor Q4 (a general purpose PNP dual transistor, or two well matched 2N5807's or equivalent), transistor Q5, capacitor C7, and resistors R11–R17 form a precision full-wave rectifier circuit with integral smoothing filtering with a time constant of 12 msec., outputting DC level representations on conductors 45 and 47, –4 dB scaled DC level representations on conductors 49 and 51, and –6 dB scaled DC level representations on conductors 53 and 55 of the microphone signals on conductors 37 and 39. Op amp 208 is biased from the 6.3 volt reference on conductor 125 to obtain maximum output voltage capability on conductors 45 and 47. Input voltages to resistor R11 which are negative with respect to 6.3 volts produce currents which are reflected by current mirror dual transistor Q4 into the load network consisting of capacitor C7 and resistors R14–R16. Input voltages to resistor R11 which are positive with respect to 6.3 volts produce currents which pass through common base-connected transistor Q5 into the load network. Resistors R12 and R13 bias transistor Q5 almost into conduction quiescently to minimize polarity crossover region signal swing at the output of op amp 208 and thus maximize the high frequency, low signal level response of the rectifier.

Resistor R17 injects current from the 4.2 volt reference into the load network to bias conductors 45 and 47, and thus the outputs of NAT circuits 57 and 59 on conductors 61 and 63 at 50 millivolts. Resistor R17 also biases conductors 53 and 55 to 25 millivolts. Since these are the inputs to NAT criterion comparators 65 and 67, the comparator outputs at 69 and 71, respectively remain unasserted at rest, even allowing for circuit component offset errors. Frequency equalization/rectifier block 41 or 43 must produce more than an additional 25 millivolts on conductor 53 or 55, and incidentally more than an additional 50 millivolts on conductor 45 or 47, to cause an assertion at comparator output 69 or 71. This corresponds to a maximum triggering sensitivity in the absence of background room noise of about 35–40 dB-SPL in the 1–4 kHz frequency range for typical sensitivity microphones.

The smoothing filter time constant of 12 msec is an appropriate compromise between conflicting considerations. If the time constant is made too short, the rectifier outputs would tend to follow the rectified signal waveform and random acoustic reflections too closely, and would not be a good DC level representation of the short time average microphone output level. If the time constant is made too long, then the near-simultaneous sensing of two inherently unsynchronized talkers required for simultaneous gating ON of both microphones would be inhibited, as the required moment-to-moment peaks and dips in their DC level representations which allow each level representation to successively exceed the other would be overly smoothed.

As discussed, DC level representation scaling switches 73 and 75 switch their outputs on conductors 77 and 79, between DC level representations on conductors 45 and 47, when the switch control inputs from the microphone gating signals on conductors 101 and 103, are asserted (high), and the –6 dB scaled level representations on conductors 53 and 55, when the switch control inputs on conductors 101 and 103, are unasserted (low).

Figure 5:
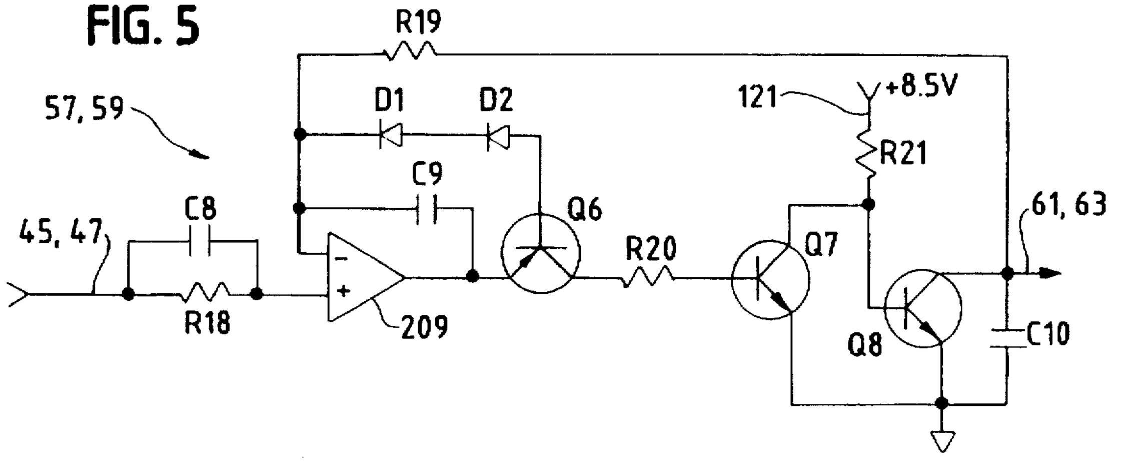

FIG. 5 shows one of identical noise adaptive threshold (NAT) generating blocks 57 and 59. Op amp 209 must be of the ground-sensing type to enable operation down to the 50 millivolt minimum voltage level appearing on conductor 45 or 47. Input resistor R18 and feedback resistor R19 are of similar value in order to balance the effects of the input offset currents of op amp 209, as is understood in the art. Capacitor C8 bypasses resistor R18 to prevent a feedback loop pole from forming from the input capacitance of op amp 209 in conjunction with resistor R18.

The inputs of op amp 209 compare the developed NAT voltage on conductor 61 or 63 to the DC level representation on conductor 45 or 47. When the input DC level representation exceeds the NAT voltage, the output of op amp 209 swings positive sufficiently to forward bias the emitter-base junction of transistor Q6 and diodes D1 and D2. This forward bias current plus any op amp inverting input current charges capacitor C10 upwards through resistor R19 towards the voltage at the non-inverting input of op amp 209 with a slow time constant equal to the product of the values of resistor R19 and capacitor C10, 4.4 seconds. The combined forward bias voltages of the emitter-base junction of transistor Q6 and diodes D1 and D2 raise the required voltage at the output of op amp 209 sufficiently to allow the use of an op amp whose output is not capable of swinging very close to ground (its negative supply). Collector current also flows in transistor Q6 when its emitter-base junction is forward biased, which biases transistor Q7 on through current limiting resistor R20. The collector of transistor Q7 sinks the current supplied by resistor R21 from the 8.5 volt supply and biases transistor Q8 off, so that capacitor C10 can be charged.

When the input DC level representation starts to dip below the NAT voltage, the output of op amp 209 begins to swing downwards sufficiently to begin to remove the forward bias from transistor Q6, thus allowing transistor Q7 to begin to turn off, allowing transistor Q8 to begin to turn on, beginning a discharge of capacitor C10. When the NAT voltage on capacitor C10 drops below the input DC level representation, forward bias is restored to transistors Q6 and Q7, turning off transistor Q8, allowing the slow charge-up of capacitor C10 to resume. Capacitor C9 slows and stabilizes to a degree the operation of the NAT generating block, but the high gain of the transistors Q6–Q8 in the discharge condition prevent full stabilization. The discharge of capacitor C10 is slightly jerky, but the tracking errors are not sufficiently large as to cause any practical problem. An advantage of the circuitry employed in the NAT generating blocks 57 and 59 is that they operate down to near ground potential on their inputs and outputs without the need for a negative supply voltage.

Figure 6:
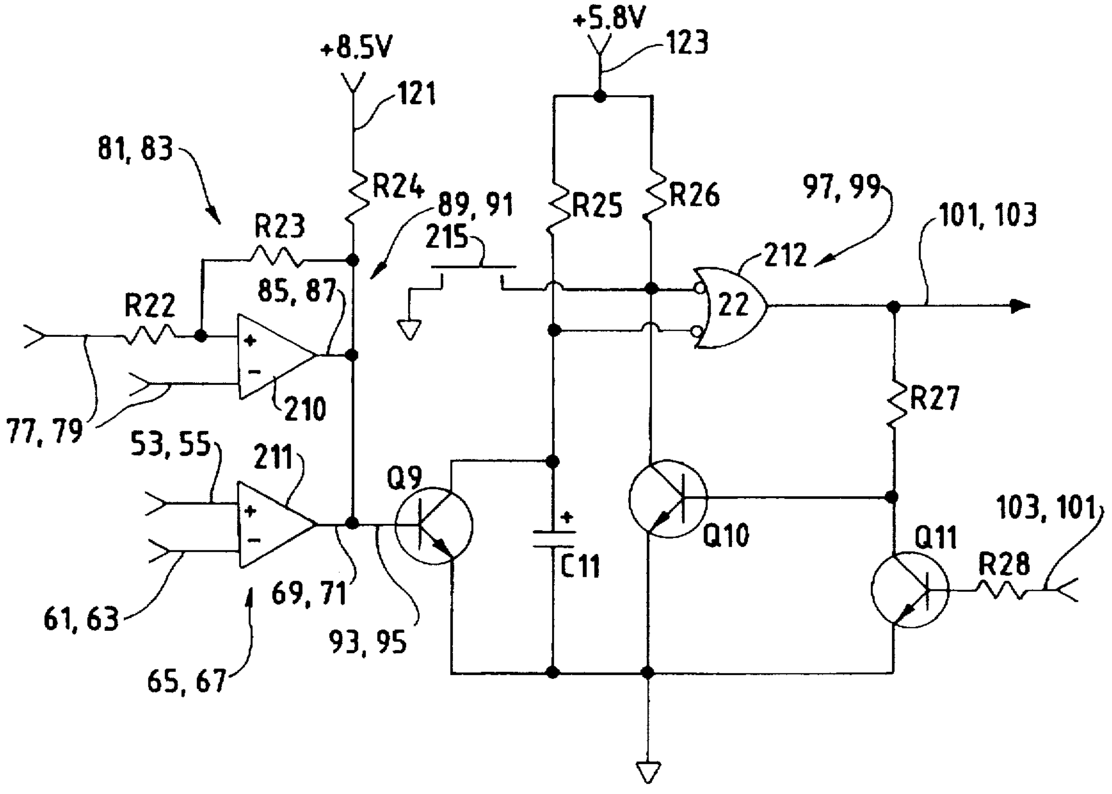

FIG. 6 shows one each of identical comparators 81 and 83, comparators 65 and 67, functional AND gates 89 and 91, and retriggerable one-shots 97 and 99. Comparator circuit 210 compares the outputs of DC level representation scaling switches 73 and 75 on conductors 77 and 79, as part of comparator 81 and as part of comparator 83. Comparitors 81 and 83 compare the level representations on conductors 77 and 79 in opposite senses, enabled by the cross coupling of their inputs. Comparator 211 compares the DC level representation on conductor 53 to the NAT voltage on conductor 61 as comparator 65 and the DC level representation on conductor 55 to the NAT voltage on conductor 63 as comparator 67. The outputs of open collector comparators 210 and 211 are connected to each other and to common pull-up resistor R24. This is a hard-wired AND connection, thus combining at a common conductor the functionality of AND gate 89, comparator outputs 85 and 69, and AND gate output 93 for one microphone control channel, and AND gate 91, comparator outputs 87 and 71, and AND gate output 95 for the other microphone control channel. Resistors R22 and R23 provide a small amount of hysteresis for op amp 210 to prevent oscillation.

When the AND condition is satisfied, resistor R24 sources current from the 8.5 volt supply on conductor 121 into the base of transistor Q9 to turn the transistor on. Transistor Q9 then discharges capacitor C11, causing the output of inverted logic NOR gate 212 appearing on conductor 101 or 103 to assert a logic high of 5.8 volts. (NOR gate 212 is one section of a Motorola MC14093B Schmitt-trigger input quad two-input NAND gate or equivalent operated between the 5.8 volt supply on conductor 123 and ground.) The microphone gating signal on conductor 101 or 103 is held for at least about 0.4 seconds beyond the duration of the last momentary trigger resulting from the conduction of transistor Q9. This is the time needed for current supplied through resistor R25 from the 5.8 volt supply on conductor 123 to charge the voltage across capacitor C11 up to the positive-going input threshold of an input of gate 212.

The microphone gating signal on conductor 101 or 103 is normally locked on for much longer than the 0.4 second retriggerable one-shot hold time due to the action of transistor Q10 and resistors R26 and R27. Once conductor 101 or 103 goes high, transistor Q10 conducts and holds the other input of gate 212 low, which in turn keeps the gate output high. This condition maintains as long as transistor Q11 remains non-conducting. The lock-on of gating signal 101 or 103 is defeated when transistor Q11 is biased on through resistor R28 by a logic high state (5.8 volts) at gating signal 103 or 101, respectively. Switch 213 allows a microphone to be forced ON for testing or demonstration purposes.

Figure 7:
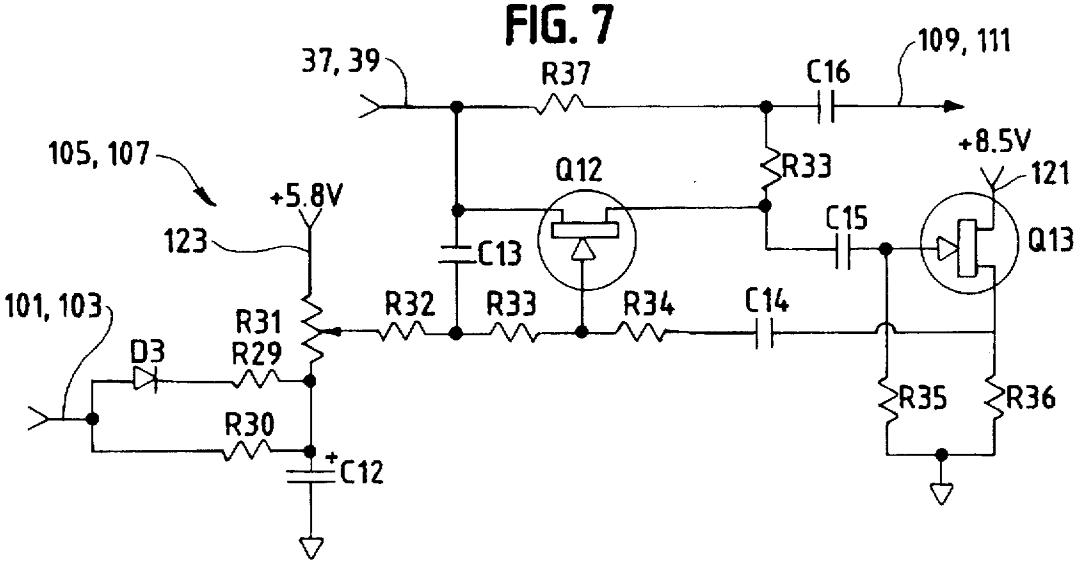

FIG. 7 shows one of identical variable attenuation circuits 105 and 107. A microphone signal output from preamp/interface circuit 25 or 27 on conductor 37 or 39 is resistively attenuated by resistors R37 and R38 and N-channel junction field effect transistor Q12. Capacitor C16 couples the attenuated signal to ground-biased conductors 109 or 111. For drain-to-source potentials on the order of 100 millivolts or less, transistor Q12 acts as a voltage-controlled resistor. The drain-to-source resistance varies from about 500 Ohms in the ON condition, with the gate voltage within a couple of hundred millivolts of the drain and source, to many megaOhms in the OFF condition, with the gate voltage negative with respect to the drain and source by an amount at least equal to the particular transistor's pinch-off voltage (0.5 to 6.0 volts for the 2N5457).

The drain and source of transistor Q12 are biased to 5.8 volts by the quiescent voltage on conductor 37 or 39. The gate voltage is varied from 5.8 volts during the ON condition to 5.8 volts less the pinch-off voltage during the OFF condition. This gate voltage is applied through a network consisting of diode D3, capacitor C12, and resistors R29–R33. This network is controlled by a microphone gating signal on conductor 101 or 103 which varies from 5.8 volts in the ON condition to 0 volts in the OFF condition. The OFF condition gate bias is scaled by trimming resistor R31 for the particular transistor Q12 used, such that the pinch-off condition is almost reached. The turn-on attack and turn-off decay times and characteristics are controlled by diode D3, resistors R29 and R30, and capacitor C12 in conjunction with the resistance versus control voltage characteristic of transistor Q12.

As is known concerning the field effect transistor used as a resistor, the even order distortion can be cancelled out, and the limited signal handling capability improved, if the gate voltage is modulated by a signal component equal to the average of the drain and source signals. This is accomplished in the present invention by capacitors C13–C15, resistors R33–R36, and N-channel junction field effect transistor Q13. Source-follower transistor Q13, in conjunction with capacitor C15 and resistors R35 and R36, form a high input impedance unity gain stage to provide a low impedance buffered version of transistor Q12's drain voltage. Capacitors C13 and C14 and resistors R33 and R34 apply the average of transistor Q12's source and drain signals to its gate. Resistor R32 is sufficiently large so as not to significantly load the signal averaging network. Capacitors C13 and C14 are sufficiently small so as not to significantly affect the attack and decay time constants of the gate bias voltage.

Figure 8:
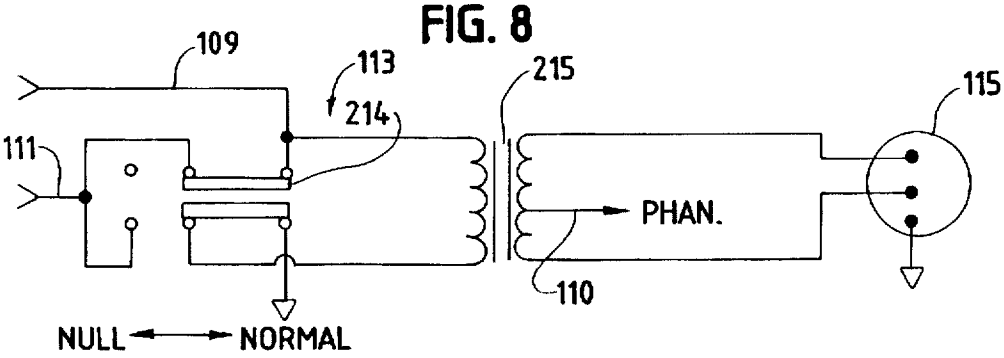

FIG. 8 shows the output interface 113. The two variable attenuation circuit outputs on conductors 109 and 111 are normally combined together by switch 214 and applied to the primary of output transformer 215, with the other lead of the transformer primary grounded. Transformer 215 applies the mixed signal in a balanced manner to output connector 115 through a 2.6:1 turns ratio. The mutual loading of the attenuation resistances of variable attenuation circuits 105 and 107, in conjunction with typical output loading results in the ON, OFF, and both ON attenuations previously noted.

To aid in adjusting input gain trim resistor R3 in preamp/interface circuits 25 and 27, a "null" position of switch 214 is provided. This applies the microphone signals on conductors 109 and 111 differentially across the primary of transformer 215, passing through to output connector 115 only the difference of the two microphone signals. With microphones 13 and 15 positioned very closely to each other, trim resistor R3 in either preamp/interface 25 or 27 may be turned down as needed to minimize the output signal at connector 115, thus matching the microphone sensitivities.

The secondary center-tap of transformer 215 draws phantom power voltage from the connected conventional mixer through connector 115 as is understood in the art. This voltage is passed through on conductor 117 to balanced microphone input connectors 33 and 35 through the primary center-tap of input transformer 205 to power any phantom-powered microphones used, and to voltage regulator 119 to power the automatic mixer.

Figure 9:
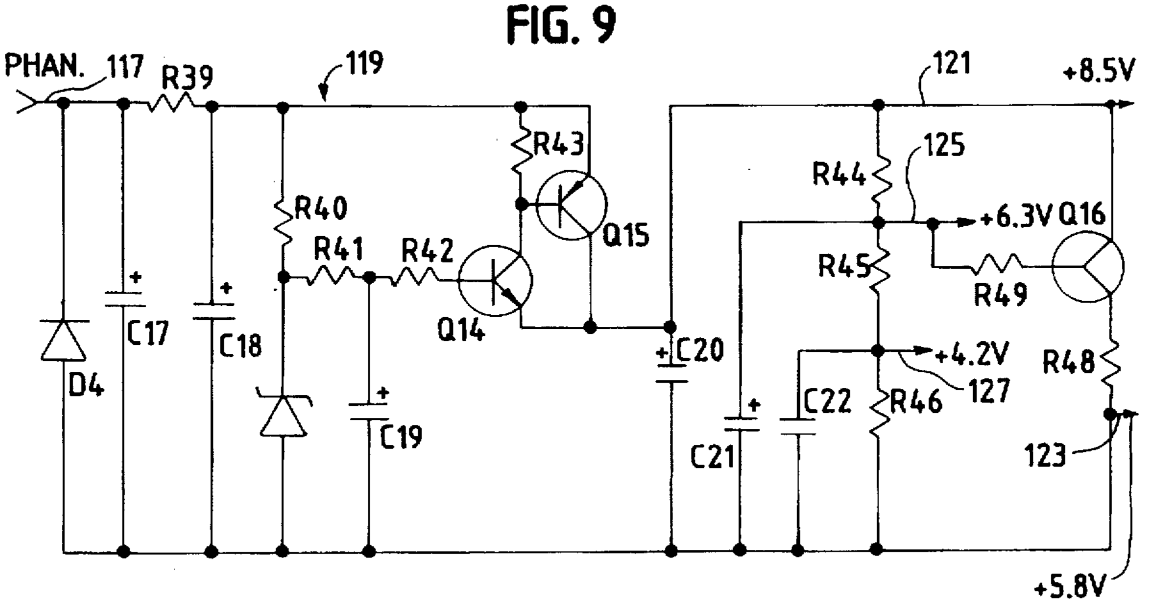

FIG. 9 shows voltage regulator 119. Phantom power voltage from a connected conventional mixer is input on conductor 117 from output interface 113. Diode D4 protects against reversed voltage. Resistors R40–R43, 9.1 volt zener diode D5 (1N5239B or equivalent), capacitors C19 and C20, and transistors Q14 and Q15 form a low quiescent current, low drop-out voltage, low-noise 8.5 volt regulator outputting on conductor 121. Resistors R44–R46, and capacitors C21 and C22 provide filtered reference voltages of 6.3 volts on conductor 125 and 4.2 volts on conductor 127. Resistors R47 and R48 and transistor Q16 provide a 5.8 volt supply on conductor 123. Resistor R48 provides a minimum load on transistor Q16 to improve the regulation of the 5.8 volt supply. Resistors R42 and R47 guard against any emitter-follower stage instability from capacitive emitter loading of transistors Q14 and Q16, respectively.

Capacitors C17 and C18 and resistor R39 form a "pi" filter which filters any incoming phantom power voltage noise. More importantly, however, the filter prevents minor fluctuations in the current draw of the automatic mixer, which occur primarily with changes in signal level, from coupling back into the microphone input of the connected conventional mixer. Being injected as a varying load on the phantom supply, the coupled current variations are partially rejected by the common-mode rejection of the conventional mixer's microphone inputs, but this is generally not adequate by itself, due to the high circuit sensitivity at the microphone inputs. The pi filter provides a high degree of filtering throughout the audio range. Any remaining current variations are well-attenuated and concentrated in the lowest frequencies, where common-mode rejection is generally the greatest.

With reference to the accompanying circuit drawings, the following circuit values are given:

| Resistors | Resistance |
|---|---|
| R1, R5, R7, R8, R22, R43 | 30.1K |
| R2, R6, R16, R20 | 60.4K |
| R4, R15 | 15.0K |
| R9 | 2.00K |
| R10, R13, R18, R19, R21, R30, R33, R34, R40, R46 | 200K |
| R11, R42, R47 | 1.00K |
| R12, R29 | 20.0K |
| R14 | 45.3K |
| R17, R23 | 10M |
| R24 | 499K |
| R25, R26, R27, R28, R32, R35 | 2.2M |
| R36, R41, R44, R45, R48 | 100K |
| R37 | 4.02K |
| R38 | 750 |
| R39 | 402 |
| R3 | 20K trimpot |
| R31 | 1.0M trimpot |
| **Capacitors** | **Capacitance** |
| C1, C12 | 1.0 μF |
| C2, C3 | .047 μF |
| C4, C7, C22 | .10 μF |
| C5 | 100 pF |
| C6, C11 | .22 μF |
| C8, C9 | 1000 μF |
| C10 | 22 μF |
| C13, C14 | 2200 pF |
| C15 | .01 μF |
| C16, C19, C20, C21 | 10 μF |
| C17, C18 | 33 μF |

It should be understood, of course, that the foregoing description refers to one embodiment of the invention and that modifications or alterations may be made therein without departing from the spirit or scope of the invention as set forth in the appended claims. For example, although the description primarily refers to an automatic mixer optimized for just two microphones, it should be recognized that an extension of the fundamental concepts to an automatic mixer optimized for a small, predetermined number of microphones is within the spirit and scope of the present invention. Specifically, the cross-comparison of the scaled DC level representations on conductors 77 and 79 may be extended to the cross-comparison of a small, predetermined number of such level representations, as discussed. Further, retriggerable one-shots 97 and 99 may have their lock-on feature defeated by the logical OR of multiple other retriggerable one-shot outputs, as discussed. Still further, representation and processing of the signals in the system in a digital rather than an analog manner is well within the scope and spirit of the invention, excluding, obviously, those aspects which are specific to an analog implementation.

What is claimed is:

1. A microphone system comprising:

a plurality of microphones, each of said microphones generating an electrical microphone signal carrying speech information;

gating means receiving each said microphone signal and gating each said microphone signal to gate ON its associated microphone in response to gating signals, said gating means including:

rectifier means for monitoring said microphone signals and producing microphone signal level representations of each of said microphone signals;

scaling means for monitoring said microphone signal level representations and producing scaled microphone signal level representations at one scaled level for microphone signals associated with gated ON microphones and at a different scaled level for microphone signals associated with gated OFF microphones;

comparison means for directly comparing said scaled microphone signal level representations and producing trigger signals associated with said microphones;

gating signal generation means responsive to said trigger signals for generating gating signals of a predetermined, non-zero time duration;

gate means, responsive to said gating signals, for gating ON said microphones associated with said trigger signals.

2. A microphone system according to claim 1 wherein said comparison means produces no more than one said trigger signal at any instant.

3. A microphone system according to claim 2 and further including threshold means for providing a plurality of thresholds, each associated with one of said microphones wherein said comparison means produces said trigger signal associated with one of said microphones only when said microphone signal level representation associated with said microphone reaches a predetermined relationship with said threshold associated with said microphone.

4. A microphone system according to claim 3 wherein said threshold means comprises means for generating threshold signal levels representative of room noise.

5. A microphone system according to claim 4 wherein each of said threshold signal levels is representative of room noise received by one of said microphones.

6. A microphone system according to claim 5 wherein each of said threshold signal levels is generated by following one of said microphone signal level representations in a slow rise, fast decay manner.

7. A microphone system according to claim 3 wherein said gating signal generation means further includes lock-on means for the maintenance of at least one of said gating signals in the absence of said trigger signals.

8. A microphone system according to claim 7 wherein the lock-on means of a said gating signal is defeated by the generation of another said gating signal.

9. A microphone system according to claim 1 wherein said gate means gates said microphones ON and OFF in a smooth, rapid attack and smooth, slow decay manner.

10. A microphone system according to claim 1 wherein said gate means partially attenuates said microphones when said microphones are OFF.

11. A microphone system according to claim 1 and further including automatic gain adjusting means for adjusting the attenuation of said gated ON microphones in accordance with the number of microphones gated ON.

12. A microphone system according to claim 2 wherein said comparison means produces one said trigger signal associated with the highest said scaled microphone signal level representation.

13. A microphone system according to claim 1 wherein said microphone system is capable of direct connection to and powering from a conventional phantom-powering microphone preamplifier input.

14. A microphone system according to claim 13 and further including voltage regulator means wherein said voltage regulator means reduces fluctuations in powering current drawn from said conventional phantom-powering balanced microphone preamplifier input.

15. A microphone system according to claim 1 wherein said plurality of microphones equals two.

* * * * *